Nov. 13, 1962     H. RUDOLPH     3,063,461
VALVE FOR USE IN RESPIRATORY AND SIMILAR EQUIPMENT
Filed May 25, 1960     2 Sheets-Sheet 1
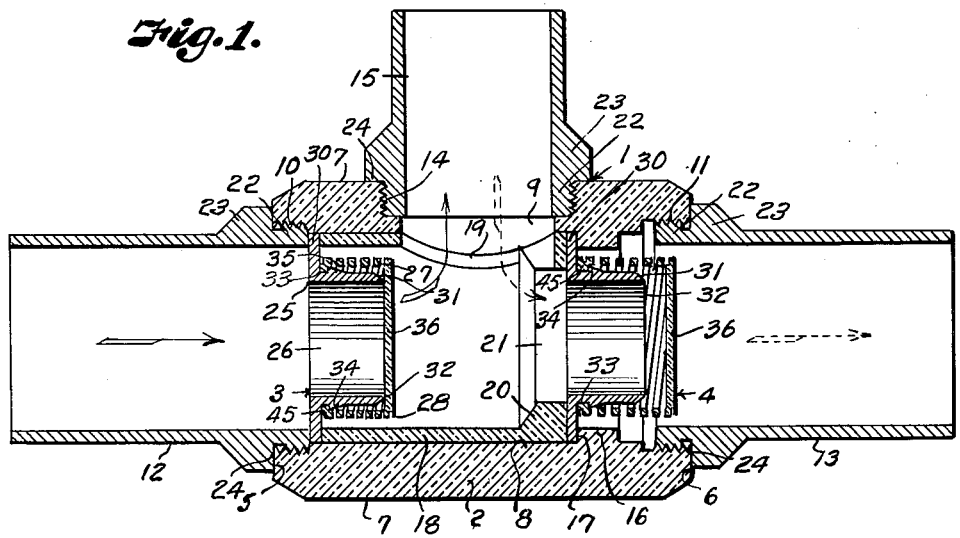
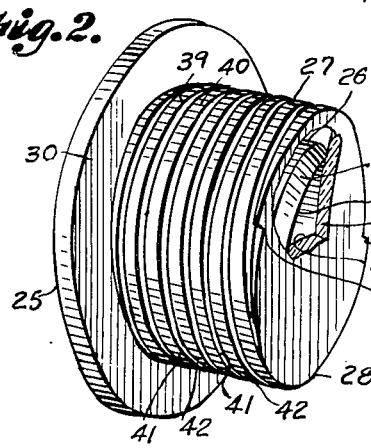
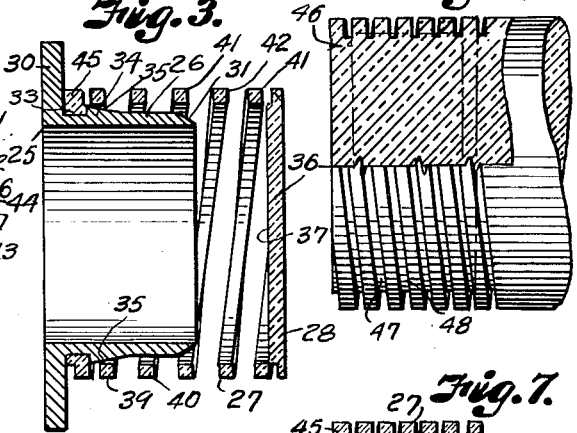
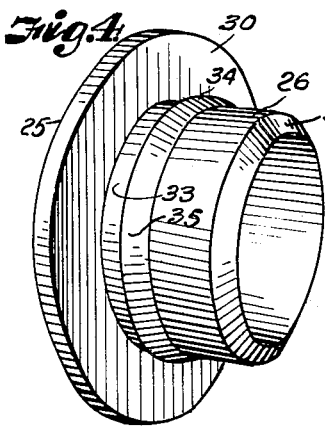
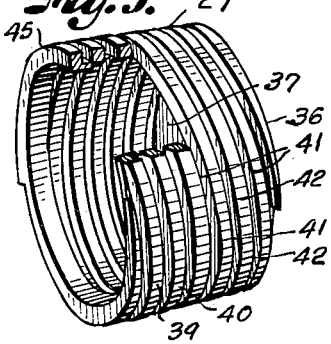
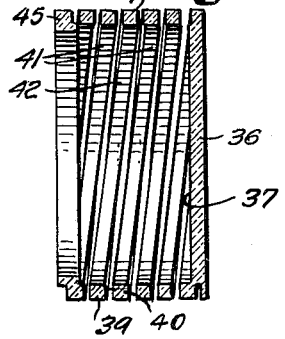
INVENTOR.
Hans Rudolph.
BY
Paul E. Mullendore
ATTORNEY.

Nov. 13, 1962     H. RUDOLPH     3,063,461
VALVE FOR USE IN RESPIRATORY AND SIMILAR EQUIPMENT
Filed May 25, 1960     2 Sheets-Sheet 2
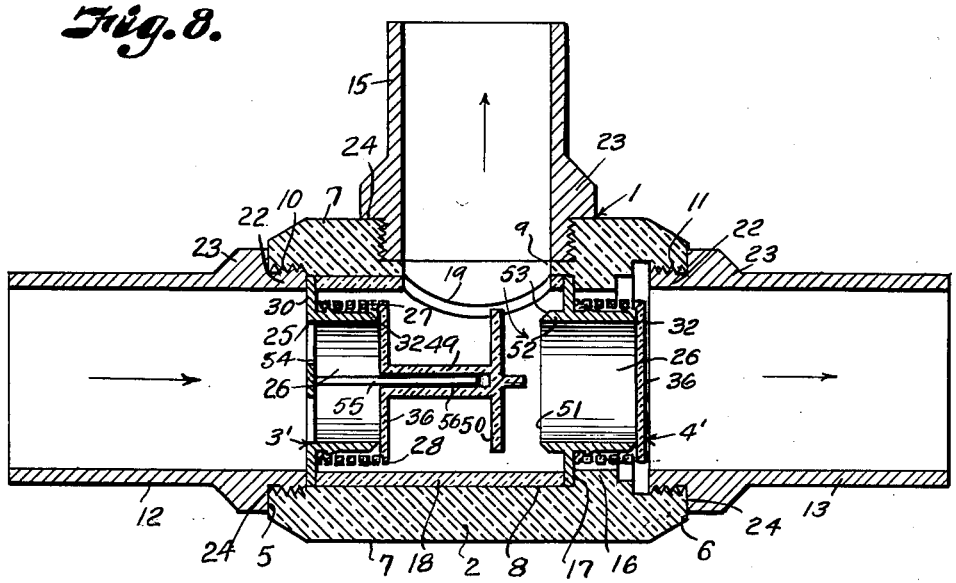
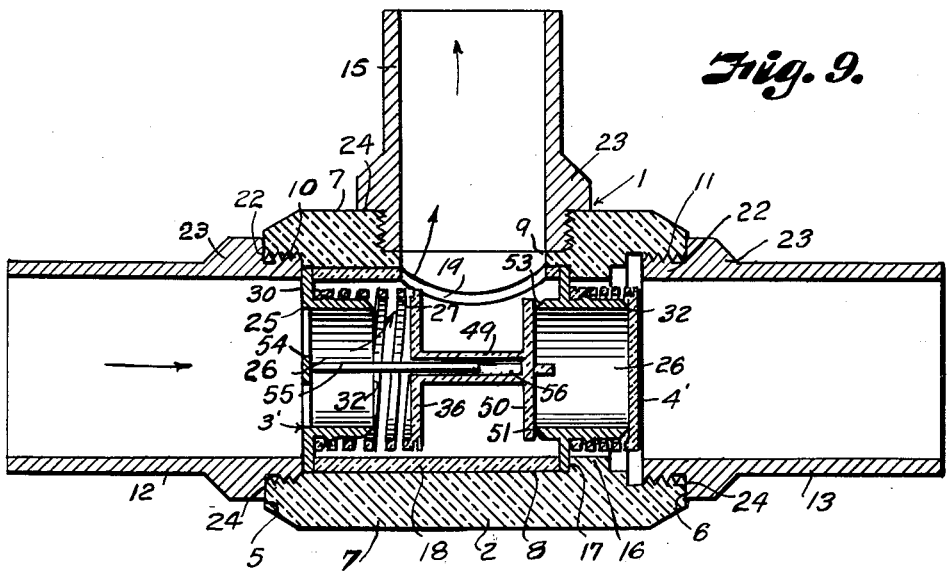
INVENTOR.
Hans Rudolph
BY Paul E. Mullendore
ATTORNEY

United States Patent Office 3,063,461
Patented Nov. 13, 1962

3,063,461
VALVE FOR USE IN RESPIRATORY AND
SIMILAR EQUIPMENT
Hans Rudolph, 6010 Sunrise Drive, Mission, Kans.
Filed May 25, 1960, Ser. No. 31,680
11 Claims. (Cl. 137—64)

This invention relates to valves particularly for use in connection with respiratory and similar equipment, and has for its principal object to provide a valve and valving elements therefor characterized by their low resistance to action thereof.

Other objects of the invention are to provide a valve structure having a minimum space to be cleared upon each operation of the valving elements thereof; to provide a valving unit wherein the valving members, spring and seat constitute a single assembly that is readily inserted and removed from the body of the valve; to provide a free acting and positively seating valve element supported by the spring element thereof in a plane parallel to and coaxial with the seat therefor; to provide a combined spring and valve element composed of non-corrosive light weight material; to provide a valve unit that is readily sterilized without damage thereto; and to provide for latching of the spring to the seat member.

Another object of the invention is to provide a valve unit that is especially adapted for apparatus for administering gas and wherein the valve elements operate responsive to breathing of the recipient.

It is also an object of the invention to provide a valve unit responsive to the air or gas supplied to the recipient, for example, in artificial respiration.

It is also an object of the invention to provide a valve unit that operates satisfactorily with a relatively small opening of the valving element.

A further object of the invention is to provide a double acting valve for controlling both the inlet and exhaust ports and wherein the valving elements are carried by the spring element therefor.

A further object of the invention is to provide a method of making the valve and spring unit whereby the action of the spring can be easily established for the particular use of the valve.

In accomplishing these and other objects of the invention, as hereinafter described, I have provided improved structure, the preferred forms of which are illustrated in the accompanying drawings, wherein:

FIG. 1 is an enlarged section of a valve constructed in accordance with the present invention and equipped with my improved valving elements.

FIG. 2 is an enlarged perspective view of one of the valve units, with a portion of the valve disk broken away to better illustrate the valve seat.

FIG. 3 is an enlarged section of the valving unit with the valve disk in unseated position.

FIG. 4 is a perspective view of the valve seat member.

FIG. 5 is a perspective view of the valve spring and disk, with a portion of the spring broken away to better illustrate the construction thereof.

FIG. 6 is an elevational view, partly in section, of a partly formed valving element, particularly illustrating a step in the method of making the spring portion thereof.

FIG. 7 is a longitudinal section through the completed valving element before it is applied to the seat member.

FIG. 8 is a section through a modified form of valve, showing a double acting valving element, the valve being suitable for use in artificial respiration, and showing both valving units in closed position.

FIG. 9 is a similar view showing the double acting valve open on the pressure side and closed on the exhaust side.

Referring more in detail to the drawings:

1 designates a valve embodying one form of the invention. The valve comprises a body member 2 and valve units 3 and 4. The body member 2 may be of various shapes and constructed of any suitable material. However, in the illustrated instance, the body member 2 is of transparent material, preferably a heat resistant plastic, and is the shape of a quadrilateral prism to provide flat end faces 5 and 6 and flat side faces 7. The body member 2 has a longitudinal cylindrical bore 8 providing a breathing chamber. The bore 8 is intersected by a transverse bore 9 extending through one of the faces 7 to provide a breathing part in connection with the breathing chamber. The ends of the bore 8 have internal threads 10 and 11 for the connection of suitable fittings 12 and 13. The transverse bore 9 has an internally threaded counterbore 14 for a similar fitting 15.

Formed in the body member 2 between the transverse bore 9 and threads 11 is an internal annular flange 16 providing an annular shoulder 17 that cooperates with a spacing sleeve 18 to position the valve units 3 and 4. The sleeve 18 has an opening 19 registering with the bore 9 and an internal flange 20 encircling a port 21 in the end thereof adjacent the shoulder 17.

The fittings each have a threaded neck 22 for engaging the corresponding threads of the body member and an annular flange 23 forming a shoulder 24 to seat against a corresponding face of the body member.

As above stated, the body member may be of other shapes and have different arrangement of fittings, depending upon the purpose for which the valve is used, and while certain features thereof are important in accommodating the valve units, it is the valve units that constitute the principal part of the invention, particularly since the valve units may be used in other types of valves. Also, they may be used directly in various parts of respiratory or like apparatus.

The valve units 3 and 4 of the valve 1 are of like construction, in that they each include a seat member 25 having an annular collar portion 26 of smaller diameter than the inner diameter of the sleeve, to provide space therebetween for accommodating the spring parts 27 of the valving elements 28 of the respective valve units 3 and 4. The seat members also have an annular flange portion 30 corresponding in diameter to the inner diameter of the bore 8 to anchor and support the collar portions thereof in coaxial alignment with the bore of the valve. The collar portions 26 of the seat members have beveled ends 31 forming, with the inner circumference of the collar portions, a substantially V-shaped annular seat 32. Also provided on the exterior of the collar portion adjacent the flange 30 is an annular groove 33 which is formed between the flange portion 30 and an external annular rib 34 having a tapering face 35 joining with the exterior of the collar portion, for facilitating application of the valving elements.

The valving elements each include a disk portion 36 having a face 37 arranged to seat on the V-shaped edge 32 of the seat member 25. The disk portion is of larger diameter than the outer diameter of the collar portion to connect with a spring element 38 that is freely and loosely slidable over the collar portion 36. In order to support the disk coaxially with the seat member and in parallel relation with the plane of the V-shaped edge 32, the spring parts 27 comprise a plurality of spirals, for example, double spirals 39 and 40 having their respective convolutions 41 and 42 interposed with each other and one of the corresponding ends of each spiral is interconnected at opposite dimetrical sides of the disk portion 36, as indicated at 43 and 44 (FIG. 2). The opposite ends are connected at opposite diametrical sides of an integrally formed ring 45 having an inner diameter to engage snugly within the annular groove 33.

The convolutions of the spirals are preferably of rectangular cross section, and when the disk portion 36 engages the seat, with the ring 45 in anchored position in the groove 33, the convolutions are slightly spaced apart and provide the tension necessary in holding the disk portion in seated position. The action of the convolutions is such that when a higher pressure exists on the seating side of the disk portion, the disk portion will move away from the seat to allow the pressure to pass between the convolutions, as shown in FIG. 3.

The tension in the convolutions is determined by the character of the material from which the valving elements are formed and by the cross sectional area thereof. I find that a satisfactory material for making the valving elements is one of the heat resistant plastics. In making a valving element, a rod 46 (FIG. 6) of the plastic material which has the outer diameter of the disk and spring portions is provided with a double spiral cut 47 and 48, as shown in FIG. 6, after which the end of the rod is bored, first to provide the inner diameter and thickness of the ring 45 and then bored to a size for intersecting the spiral cuts 47 and 48. The depth of the latter bore corresponds to the relaxed length of the spring. After making the latter bore, the bottom thereof is faced to provide the inner face 37 of the disk portion. A transverse cut is made across the rod to provide a disk portion 36 of the desired thickness. The finished valving element appears in FIG. 7.

The valve modification shown in FIGS. 8 and 9 is of substantially the same construction as the form just described, with the exception that the inlet valve 3' is provided with an axial stem 49 carrying a disk portion 50, and the seating member of the outlet valve 4' is provided with a seat 51. The seat 51 is provided by an extension 52 of the collar portion on the opposite side of the anchoring flange. The peripheral edge of the collar extension 52 is beveled as at 53 to provide a V-shape for the seat 57 for the disk portion 50. In this valve, the added weight of the stem 49 and the disk portion 50 may require a supplementary support. This may be provided by a spider 54 in the inlet end of the collar 26 to carry a guide pin 55 that extends into a bore 56 of the stem 49. In this way the valving elements are slidably supported on the pin substantially concentric with the seat 51.

The valving units are easily assembled by sliding the ring 45 over the annular collar portion 26 thereof and over the inclined face 35 of the rib 34. The ring 45 being of resilient material, expands sufficiently to slip over the rib and snap into the groove 33. The valving unit, including the spring portion, is thus anchored in position with the face 37 of the disk portion 36 bearing upon the seat 32. While the spring portion is very resilient, there is sufficient support to retain the disk portion concentric with the axis of the seat member, in which position the coils loosely encircle the collar portion 26.

Assuming that the valve units 3 and 4 are assembled as described, and that they are to be placed in the valve body illustrated in FIG. 1, the valve unit 4 is inserted from the threaded end 10 into the bore 8 until the flange 30 thereof seats against the shoulder 17 of the internal flange 16. In this position, the valving element extends outwardly in the direction of the threaded end 11 of the bore. The sleeve 18 is then inserted into the threaded end of the bore 10 and moved into position so that the flange 20 thereof bears against the flange 30, in which position the opening 19 registers with the transverse bore 9. The valve unit 3 is then inserted through the threaded end 10 of the body until the flange 30 thereof seats against the end of the sleeve. The threaded neck 22 of the fitting 12 is turned in the threaded end 10 to clamp the flange 30 of the unit 3 against the sleeve and the sleeve and flange 30 of the unit 4 against the shoulder 17. The fittings 13 and 15 are then turned into the threads 11 and 14 to complete the assembly.

A valve thus assembled may be used for various purposes, for example, to administer oxygen, in which case the fitting 12 would be connected with the oxygen supply and the fitting 15 is connected with a mask or other means by which the oxygen is administered to the recipient. The fitting 13 may be connected with various testing apparatus, or it may exhaust to atmosphere.

Inhalation by the recipient will create a negative pressure in the breathing chamber and act on the disk portion of the valve unit 3 so that the valving element will open. Unseating of the disk portion as shown in FIG. 3 will expand the spring element so that oxygen will pass through the seat member, through the spaces between the convolutions of the spring, and through the fitting 15. On exhalation, a positive pressure will be created in the breathing chamber and act on the disk portion 36 of the valve unit 3 to cause seating of the disk portion for that valving unit and unseating of the disk portion 36 of the valve unit 4, as shown in FIG. 1. At the end of exhalation, the pressure will drop between the valving units and the spring element 27 of the valving unit 4 will seat the disk portion 36 thereof. On the next inhalation, the spring will hold the disk portion of the valve unit 4 closed, but the disk portion of the valve unit 3 will open, as previously described. Since an actual valve is approximately one-half the scale as shown in FIG. 1, it will be obvious that there will be relatively small dead space between the valves, and that the space will be substantially cleared on each cycle of operation.

The form of invention shown in FIGS. 8 and 9 is for a different use, in that the valving unit 3' is equipped with the disk portion 50 and the seat member of the unit 4' is provided with the seat 51, whereby the air or gas administered through the fitting 12 is all diverted through the fitting 15, since the opening of the disk portion 36 results in seating of the disk portion 50 to close the exhaust valve 4'. For example, this type of valve may be used in establishing artificial respiration, in which case the fitting 15 will be connected with a face mask or the like and the fitting 12 may be used for supplying air. The fitting 13 may simply form a duct for the exhaust air expelled from the lungs of the recipient. On discharging air through the duct 12, the disk portion of the unit 3' unseats and the disk portion 50 seats to cover the exhaust port, so that all of the air is discharged through the fitting 15 for inflating the lungs of the recipient. On suspension of the pressure in the fitting 12, the spring 27 will seat the disk portion 36 of the inlet valve unit 3' and unseat the disk portion 50 relatively to the seat 51, whereupon the air is expelled through the fitting 13 and collar portion 26 of the unit 4'. The pressure of the discharged air is sufficient to unseat the disk portion 36 of the unit 4' and provide for exhaust thereof through the fitting 13.

From the foregoing it is obvious that I have provided a valve and valving elements therefor which are characterized by their low resistance to the action thereof and the spring elements are highly resilient, to operate with a minimum pressure differential. It is also obvious that the valving units, as well as the valve, may be manufactured in accordance with the invention of light weight materials which are noncorrosive and resistant to heat, so that the parts of the valve may be readily sterilized. It is also obvious that the valving units are easily manufactured and assembled. It is also obvious that by constructing the body of the valve of transparent material, the action of the valving elements are readily observed.

What I claim and desire to secure by Letters Patent is:

1. A valve unit including a tubular member providing a port and having a seat on one end encircling said port and having an anchoring means at the other end, and a valving element mounted on the tubular member, said valving element having a disk portion for engaging said seat to close said port and having a plurality of helical spirals each having convolutions disposed between the convolutions of the other and loosely encircling the tubular member with ends thereof integral with the disk portion at points spaced substantially uniformly about the disk portion and having the opposite ends in integral connection with a ring portion encircling the tubular member at the anchoring means to retain the disk portion yieldingly on said seat, the convolution of said spirals being slightly spaced apart when the disk portion is seated on the seat of the tubular member and movable from each other for widening the spaces therebetween upon unseating of the disk portion.

2. A valve unit as described in claim 1 wherein the valving element is of a non-corrosive plastic material.

3. A valve unit including a seat member having a tubular portion providing a port and having a seat on one end encircling said port and having a circumferential anchoring flange at the other end, and a valving element mounted upon said tubular portion having a disk portion for engaging said seat to close said port and having a plurality of helical spirals each having convolutions disposed between the convolutions of the other and in slightly spaced apart relation, said spirals having ends thereof in connection with the disk portion at points spaced substantially uniformly about the disk portion and having the opposite ends in connection with a ring portion tightly encircling the tubular portion at the anchoring flange to retain the disk portion yieldingly on said seat, the convolutions of said spirals being movable from said slightly spaced apart relation for widening passageways therebetween upon unseating of the disk portion.

4. A valve unit including a seat member having a tubular portion providing a port and having a seat on one end encircling said port and having an anchoring flange at the other end, and a valving element mounted upon said tubular portion having a disk portion for engaging said seat to close said port and having a plurality of spirals with ends thereof integral with the disk portion at points spaced substantially uniformly about the disk portion and having the opposite ends in integral connection with a ring portion encircling the tubular portion at the anchoring flange, said tubular portion having an annular rib cooperating with said flange to retain the ring portion therebetween, said spirals having resilient convolutions with the convolutions of one spiral disposed between the convolutions of the other spiral and encircling the tubular portion said convolutions of the respective spirals being movable relatively to each other for flow of a fluid therebetween upon unseating of the disk portion responsive to pressure differential on respective opposite faces of said disk portion.

5. A valve unit including a seat member having a tubular portion providing a port and having a seat on one end encircling said port and having an anchoring flange at the other end, and a valving element mounted upon the tubular portion of the seat member and having a disk portion for engaging said seat to close said port and having a plurality of resilient helical spirals with ends thereof integral with the disk portion at points spaced substantially uniformly about the disk portion and having the opposite ends in integral connection with a ring portion encircling the tubular portion at the anchoring flange, said tubular portion having an annular rib cooperating with the flange to provide an annular groove therebetween, said annular rib having a tapered face for expanding the ring portion thereover and into the annular groove when the ring portion is pushed over the rib for holding the disk portion on said seat, one of said spirals having convolutions loosely disposed between convolutions of the other and freely encircling the tubular portion and movable apart in an axial direction for substantially free flow of a fluid therebetween upon unseating of the disk portion responsive to pressure differential on respective opposite faces of said disk portion.

6. A valve unit including a tubular member providing a port and having a seat on one end encircling said port and having an anchoring means at the other end, a valving element mounted on the tubular member and having a disk portion for engaging said seat to close said port, a stem coaxially projecting from the disk portion, and a valve disk on said stem, said valving element having a plurality of spirals having convolutions with the convolutions of one spiral between the convolutions of the other spiral, said spirals having ends thereof integral with the disk portion at points spaced substantially uniformly about the disk portion and having the opposite ends in integral connection with a ring portion encircling the tubular member at the anchoring means to retain the disk portion and said disk coaxially of said seat upon unseating of the disk portion, said convolutions of the respective spirals being movable from each other to widen passageways therebetween upon unseating of the disk portion.

7. In a respiratory valve, a seat member having a tubular portion providing a port for flow of a respiratory medium and terminating in an annular seat, a valving element mounted on said tubular portion, said valving element having a disk portion for engaging said seat to close said port and having a plurality of helical spirals, each spiral having convolutions disposed between the convolutions of the other spiral and loosely encircling the tubular portion with said convolutions slightly spaced apart when the disk portion is in said seated position, a ring connecting opposite ends of the spirals and fixed to said tubular portion to retain said disk portion on said seat, said convolutions being yieldable upon unseating of the disk portion responsive to pressure differential on the respective sides of said disk portion to stretch said convolutions and to widen the spaces therebetween for flow of said respiratory medium when the disk portion is unseated, and means cooperating with said helical spirals to maintain said disk portion in axial alignment with said seat.

8. A respiratory valve as described in claim 7, wherein the respiratory valve includes a hollow body member providing a breathing chamber having a breathing port for alternately establishing a negative low pressure and a positive high pressure within said breathing chamber, and in which the seat member is mounted in the body member and the tubular portion thereof constitutes an inlet port for inflow of a respiratory medium, a similar axially aligned seat member providing an outlet port, a valving disk, means for supporting the valving disk coaxially with the outlet port, a rigid connection between said disk portion of the valving element and the valving disk for seating the valving disk in closing relation with the outlet port upon unseating of the disk portion responsive to negative pressure within the breathing chamber.

9. A respiratory valve, including a hollow body member providing a breathing chamber therein, axially ailgned seat members in connection with the breathing chamber, said seat members being spaced apart and having axially aligned tubular portions, one providing an inlet port into said chamber and the other providing an outlet port from said chamber and having annular seats on outlet ends of said tubular portions, inlet and outlet valving elements mounted respectively on said tubular portions, said valving elements having disk portions engaging said seats to close said ports and each valving element having resilient helical spirals with convolutions thereof loosely encircling the tubular portions of said seat members, and a ring connecting opposite ends of the spirals and fixed to the tubular portions at inlet ends thereof to retain said disk portions on said seats by spring action in the convolutions, said body member having a breathing port opening into the breathing chamber between said disk portions to alternately establish a negative low pressure and a positive high pressure in the breathing chamber, said convolutions of one valving element being stretchable responsive to the negative pressure and the convolutions of the other valving element being stretchable responsive to positive pressure in the breathing chamber to widen the spaces between the convolutions for substantially free flow of respiratory medium when the respective disk portions are unseated.

10. A respiratory valve as described in claim 9, and including means for reducing the volumetric space between said disk portions, including an annular seat on the outlet seat member, a disk for engaging said seat, and means for supporting said disk by the disk portion of the valving element on said inlet seat member to seat said disk with unseating of said disk portion.

11. A respiratory valve as described in claim 9, and including means for reducing volumetric space between said disk portions, comprising an annular seat on the outlet seat member, a disk for engaging said seat, means for connecting said disk with the disk portion of the valving element on said inlet seat member to seat said disk with unseating of said disk portion, and guide means for supporting said inlet valving element and said disk in concentric relation with their respective seats.

References Cited in the file of this patent
UNITED STATES PATENTS

| | | |
|---|---|---|
| 2,249,971 | Mecorney | July 22, 1941 |
| 2,823,670 | Page | Feb. 18, 1958 |
| 2,845,085 | Robbins | July 29, 1958 |
| 2,875,779 | Campbell | Mar. 3, 1959 |
| 2,896,661 | Becker | July 28, 1959 |